United States Patent [19]
Smith

[11] 3,811,688
[45] May 21, 1974

[54] MECHANICAL SEAL FOR ROTARY SHAFT

[75] Inventor: Basil G. Smith, Kentville, Nova Scotia, Canada

[73] Assignee: Basil Smith Seals Limited, Nova Scotia, Canada

[22] Filed: Dec. 28, 1971

[21] Appl. No.: 213,202

[30] Foreign Application Priority Data
Dec. 29, 1970 Canada .............................. 101600

[52] U.S. Cl. ...................... 277/39, 277/25, 277/41, 277/95
[51] Int. Cl. .......................... F16j 9/00, F16j 15/16
[58] Field of Search ................... 277/39, 41, 25, 95

[56] References Cited
UNITED STATES PATENTS
| | | | |
|---|---|---|---|
| 3,044,787 | 7/1962 | Derman | 277/95 X |
| 2,877,029 | 3/1959 | Peguet et al. | 277/41 |
| 3,090,629 | 5/1963 | Lee et al. | 277/95 |

Primary Examiner—Samuel B. Rothberg

[57] ABSTRACT

A mechanical seal includes a stationary housing of the type adapted to be mounted on and connected to a machine casing. A rotor is positioned within the confines of the housing and is rotatable relative thereto about an axis. This rotor includes an outwardly directed seal engaging surface. A floating seal ring surrounds the rotor and sealingly engages the same. The seal ring confines the rotor such that the only substantial movement which can take place therebetween is rotation of the rotor about the above mentioned rotation axis. This seal ring is radially spaced from the stationary housing. A device is provided which bridges the space between the housing and the floating seal ring and provides a fluid seal between them. The bridging device, seal ring and housing are so constructed and arranged as to permit floating movement of the seal ring relative to the housing in response to extraneous forces applied to the rotor while at the same time maintaining fluid sealing relation between the seal ring and housing.

10 Claims, 8 Drawing Figures

MECHANICAL SEAL FOR ROTARY SHAFT

BACKGROUND OF THE INVENTION

This invention relates to self-contained fluid seals, particularly to devices for providing a fluid tight seal between two relatively rotatable machine parts.

As those skilled in this art will appreciate, the provision and maintenance of substantially leak-proof seals between moving machine parts is a complicated and difficult task. Over the past many years, hundreds of different seal designs have evolved, each having for its object the elimination of a particular problem encountered. Needless to say, many of these designs did not live up to expectations while others have since become obsolete.

One problem which has been encountered in the pulp and paper industry involves the provision and maintenance of an adequate fluid seal between the casing of the pulp stock agitator and the impeller shaft which extends through and into the interior of such casing. On the impeller shaft there is a series of paddles which, when the shaft is rotated, effects mixing of the pulp stock. This shaft, which is rotated at speeds of about 20–120 RPM, is subject to heavy shock and vibration as the paddles hit heavy portions of the stock. As a result of this a substantial amount of deflection (lateral, angular and endwise) of the shaft takes place. This shaft deflection makes it difficult to maintain a tight fluid seal between the shaft and the agitator casing and most pulp and paper plants experience serious leakage problems at this point. Many plants regularly experience leakage rates here in the order of 10 gallons of stock per hour or 240 gallons per day per unit. Since a large plant will have a large number of these units in operation the total leakage per day is indeed substantial.

BRIEF SUMMARY OF THE INVENTION

The primary object of the present invention is to provide a mechanical seal capable of providing a long lasting fluid sealing effect between a rotating shaft and a machine casing under adverse conditions the same as or similar to those mentioned above, i.e., when the rotating shaft is subject to heavy shock loads causing deflection and vibration of same.

The mechanical seal according to the present invention includes a housing of the type adapted to be mounted on and connected to a machine casing. A rotor is positioned within the confines of the housingand is rotatable relative thereto about an axis. This rotor includes an outwardly directed seal engaging surface. A floating seal ring surrounds the rotor and sealingly engages the same. The seal ring permits rotation of the rotor about the above mentioned rotation axis. This seal ring is spaced from the stationary housing. Means are provided which extend between the housing and the floating seal ring to provide a fluid seal between them. The last mentioned means and the seal ring are so constructed and arranged as to permit floating movement of the seal ring relative to the housing in response to extraneous forces applied to the rotor while at the same time maintaining fluid sealing relation between the seal ring and housing.

It will be appreciated that the rotor referred to above is one that surrounds a sealingly engages an elongated shaft. While, for most arrangements, this rotor is of the type that is made separately from the shaft and subsequently connected thereto by some suitable means, it should be appreciated that it may be possible, in some embodiments, to form the rotor integrally with the shaft.

By permitting the seal ring to "float" relative to the housing, it has been found that the shock loads on and the resulting deflection of the rotating shaft do not adversely affect the sealing relationship between the seal ring and the rotor; in other words, the forces applied by the rotor to the seal ring remain below the level at which damage would be caused to the seal by virtue of the "floating" action referred to above.

In a typical embodiment, the seal ring confines the rotor such that the only substantial movement which can take place therebetween is rotation of the rotor relative to the seal ring about its rotation axis. In the preferred form of the invention the seal engaging surface of the rotor is of toroidal configuration with the floating seal ring being shaped to closely embrace and complement the same. Preferably, the seal ring is made of a flexible synthetic plastics material. By virtue of its flexibility the seal ring is capable of a small amount of relative rocking movement about the center of curvature of the toroidal surface as seen in the radial cross section of the rotor. A certain amount of this relative rocking movement takes place under the influence of certain types of stresses (rising from angular deflection and end play of the shaft) which are applied to the rotor by the rotating shaft means.

In the preferred embodiment the means extending between the housing and seal ring includes a plurality of wedging rings disposed in the space between the housing and the seal ring. These wedging rings have wedge-shaped radial cross-sections to provide wedging surfaces thereon. The housing and the seal ring are also provided with wedging surfaces which complement and contact the respective wedging surfaces of the wedging rings, with all of the wedging surfaces being arranged such that when the wedging rings are biased in the axial direction, they come into sealing contact with the wedging surfaces of the housing and seal ring. Biasing means are provided to apply forces to the wedging rings in the axial direction to effect the sealing engagement referred to above. Under the influence of extraneous forces applied to the rotor, the wedging rings move back and forth thereby permitting the above mentioned floating of the seal ring relative to the housing. To provide this freedom of movement of the wedging rings, the biasing means comprise springs or other suitable equivalents such as resilient rubber or synthetic materials, which are interposed between the stationary housing and the wedging rings.

BRIEF DESCRIPTION OF THE VIEWS OF DRAWINGS

A preferred embodiment of the invention will now be described with reference being had to the drawings in which.

DESCRIPTION OF PREFERRED EMBODIMENTS OF THE INVENTION

Figure 1:
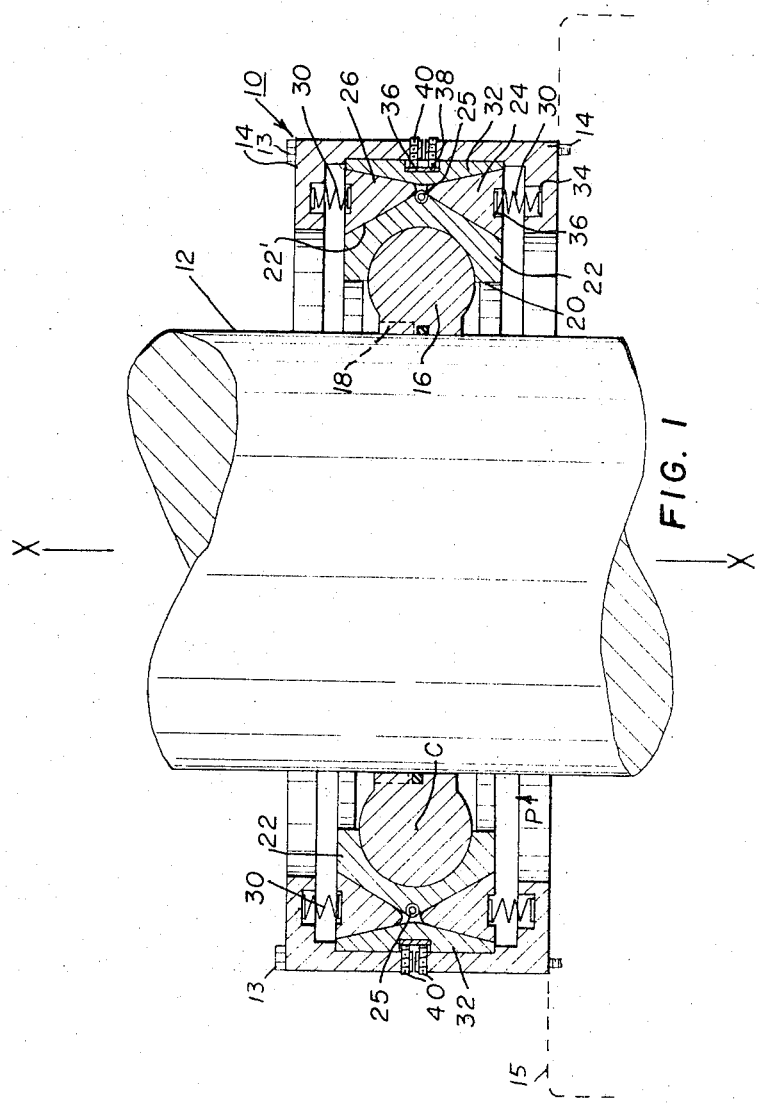
FIG. 1 is a cross sectional view of the assembled mechanical seal according to the present invention.

Referring now to the drawings, there is shown a mechanical seal 10 for effecting a fluid seal between rotatable shaft 12 and a stationary annular housing 14. The shaft 12 is subject to extraneous forces which tend to cause deflection thereof (i.e., end play, lateral and angular deflection) relative to the stationary housing 14. Housing 14 includes two annular parts joined together by fasteners 13. Housing 14, in use, is sealingly connected to a machine component 15 within which fluid under pressure P is contained and into which the shaft 12 extends.

A rotor 16 is concentrically positioned within the confines of the annular housing 14 and is rotatable relative thereto about rotation axis X—X. It will be noted that this rotor sealingly embraces shaft 12 and is secured for rotation therewith as a unit by means of a key 18 or other suitable securing means. This rotor is provided with a radially outwardly directed seal engaging surface 20 of toroidal configuration. This surface is, of course, smoothly machined and finished.

Figure 2:
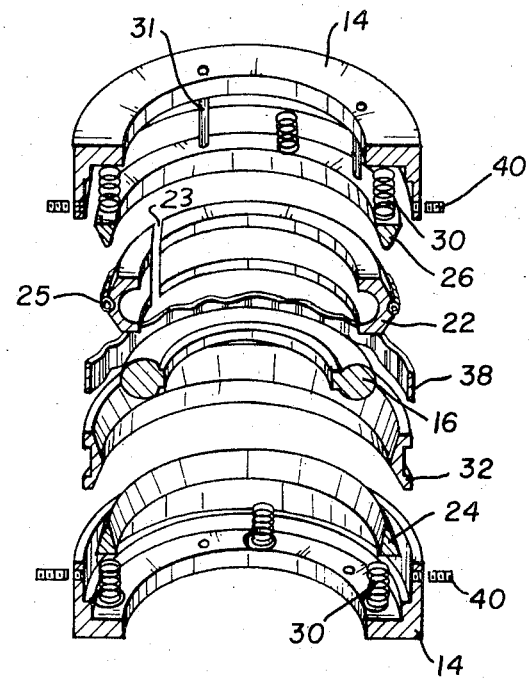
FIG. 2 is a cut-away exploded view of the seal assembly.
Figure 3:
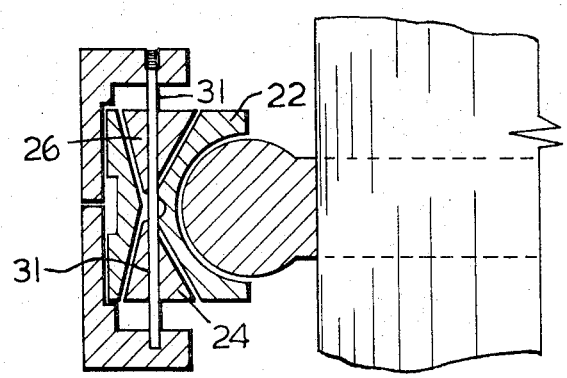
FIG. 3 is a view similar to FIG. 1 of one-half the seal assembly taken through one of the sealing wedge guide pins.
Figure 4:
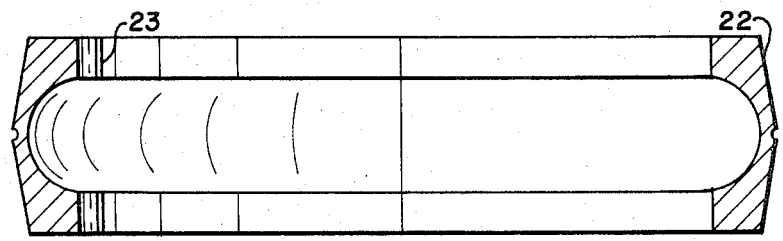
FIG. 4 is a cross-sectional view of the floating seal ring.
Figure 5:
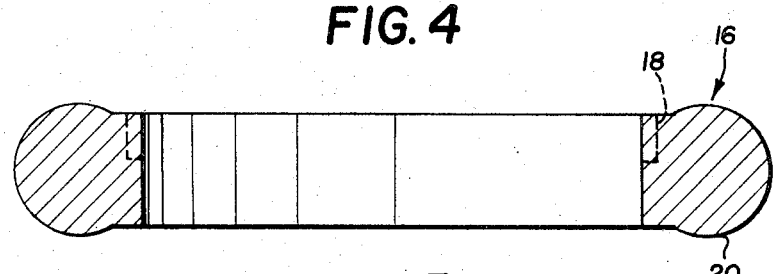
FIG. 5 is a cross-sectional view of the rotor element.
Figure 6:
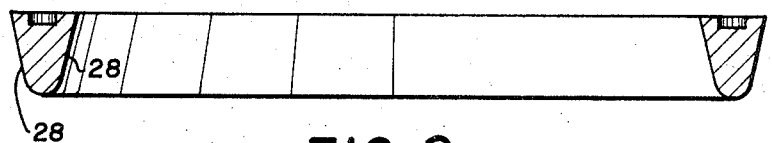
FIGS. 6 and 7 are cross-sectional elevational views of the wedging rings and the means within the stationary housing for providing wedging surfaces respectively.
Figure 7:
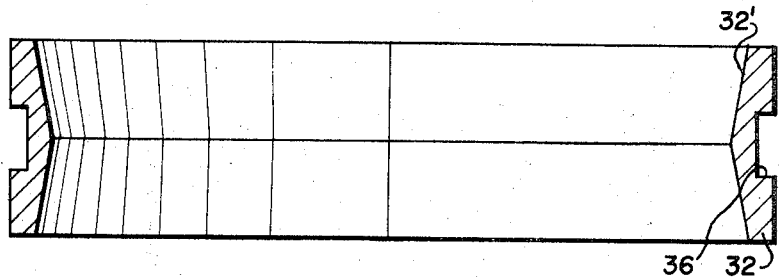

A floating seal ring 22 surrounds the rotor 16 and sealingly engages the seal engaging surface 20 of the rotor. The seal ring 22 embraces the toroidal seal engaging surface of the rotor and confines it in such a manner that the only substantial movement which can take place between the rotor and the seal ring is rotation of the rotor about axis X—X. The only other type of movement which can take place between the seal ring and the rotor is a small amount of rocking movement of the seal ring (when the latter is made from a flexible material) about the centre of curvature C of the rotor toroidal surface as seen in a radial cross section. However, this movement is really quite insignificant as compared with the primary type of motion permitted therebetween. In the preferred embodiment of the invention, the seal ring 22 is split as at 23 in FIGS. 2 and 3, such split being approximately at a tangent to the circle defining the inside diameter of the ring whereby the radially inwardly directed forces exerted on the seal ring 22 by the assembly tend to substantially close such split and substantially eliminate fluid leakage therethrough. A garter spring 25 completely surrounds the seal ring 22 and is disposed in a suitable circumferential groove 25' in the latter. Garter spring 25, of course, also applies a radially inwardly directed force to the seal ring 22 to enhance the fluid sealing relationship between the latter and the rotor 16. The seal ring 22 can also be made without the split although in this case it is more difficult to position the seal ring on the rotor during assembly of the device. When the seal ring 22 is made from "Teflon" (registered trademark) or other suitable material such as "polycarbonate," the seal ring can be heated to about 400°F, at which temperature it will be sufficiently flexible as to permit it to be snapped over the rotor. When the seal ring 22 is made without the split the garter spring 25 is still used to advantage to enhance the fluid sealing effect between the rotor and the seal ring.

It will be noted that the seal ring 22 is radially spaced from the stationary housing 14. A pair of wedging rings 24 and 26 are concentrically positioned in the space between housing 14 and seal ring 22. These wedging rings have wedge-shaped radial cross-sections which define wedging surfaces 28 thereon. In addition, it will also be noted that the housing 14 is provided with an annular member 32 having wedging surfaces 32' while seal ring 22 has wedging surfaces 22' thereon, both sets of wedging surfaces 22' and 32' being arranged to cooperate with and to complement the wedging surfaces 28 provided on the wedging rings 24 and 26.

Interposed between the housing 14 and each of the wedging rings 24 and 26 are a plurality of circumferentially spaced compression springs 30 which serve to bias wedging rings 24 and 26 towards each other in the axial direction. Since the respective wedging surfaces of the wedging rings, the sealing ring 22 and the wedging surfaces 32' provided on the annular member 32 disposed in housing 14 cooperate and complement each other, such wedging rings, being biased towards each other by the compression springs 30, effect fluid sealing engagement between the floating seal ring 22 and the housing 14. The compression springs 30 on the hydraulic pressure side P of the seal may be substituted with a rubber ring (not shown) which is positioned between the housing and the adjacent wedging ring 24 to provide the biasing effect mentioned above. The use of the rubber ring is desirable when handling certain types of slurries, e.g., wood pulp, which might tend to clog and foul the springs and render them ineffective.

The wedging surfaces 32' on the annular member 32, as seen in a radial cross section view slope away from one another in opposite directions at an angle of about 15° to the axis of rotation of the shaft. The wedging surfaces 22' on the seal ring 22 slope in opposite directions away from one another at an angle of about 30° to the axis of rotation of shaft 12. The exact angles of these surfaces are not critical and they may be varied considerably so long as the wedging surfaces complement each other and provide the sealing effect described. As will be readily apparent from an inspection of FIG. 1, the wedging surfaces of each of the wedging rings 24 and 26 are designed to angularly complement the wedging surfaces 22' and 32' referred to above. It is also desirable, although not essential, to provide means for applying radially inwardly directed forces on the annular member 32, and for this purpose, a shallow groove 36 is provided on the outwardly directed face of member 32 and an undulating flat spring 38 is disposed therein which bears against the interior of housing 14 and against the bottom of groove 36. In addition, a plurality of radially directed adjustment screws 40 are provided in circumferentially spaced relation in housing 14 which bear against the flat spring 38. When screws 40 are tightened they compress the annular member 32 radially inwardly. Adjustment screws 40 are particularly useful after a certain amount of wear of the several wedging surfaces has taken place and a small amount of fluid leakage past the same has developed; in this event tightening up the screws 40 corrects the leakage problem at least temporarily and until the necessary repairs and replacements can be made.

In order to retain compression springs 30 in their respective circumferentially spaced locations, shallow recesses 34, 36 ar provided at circumferentially spaced locations in the housing 14 and the respective wedging rings 24, 26 thereby to receive and retain the opposite ends of each of the springs 30.

To prevent rotation of wedge rings 24, 26 and to prevent them from becoming completely displaced, a plurality of circumferentially spaced steel guide pins 31 (FIGS. 2 and 3) are provided, each located between an adjacent pair of the compression springs 30. Opposing ends of each pin 31 are disposed in suitable holes 31' in the housing 14. Wedging rings 24 and 26 each include spaced holes therethrough, through which the respective pins extend, with the rings 24, 26 being free to move back and forth along these pins under the influence of extraneous forces applied to rotor 16.

From the construction described above, it will be appreciated that when impact forces or the like are transmitted through shaft 12 to the rotor 16, the seal ring 22 and the wedging rings 24 and 26 move relative to one another and to the housing 14 whereby to dissipate the impact energy and lessen the probability of damage to the seal ring 22. Because of the action of the compression springs 30 which continually urge the wedging rings 24, 26 towards each other and into sealing engagement with the wedging surfaces 32' provided on annular member 32 located in the housing and the wedging surfaces 22' on the seal ring 22, an effective fluid seal is maintained between the seal ring and the housing at all times.

It will be appreciated that no means have been provided to prevent rotation of floating seal ring 22 along with rotor 16. Hence the amount of rotation of seal ring 22 will depend on the relative amounts of frictional forces between the seal ring 22 rotor 16 and between wedge rings 24, 26 and the seal ring. Generally speaking, only a limited amount of rotation of seal ring 22 has been found to take place and this does not appear to create any difficulties.

In the embodiment shown, annular element 32, wedging rings 24, 26 and seal ring 22 are made from Teflon which is the registered trademark term for polytetrafluoroethylene. This material can withstand temperatures up to 500°F.; it is able to withstand the chemical action of many different types of highly corrosive fluids and the material possesses a relative low coefficient of friction thus providing for freedom of relative movement between several parts of the assembly. Further, because of the flexibility inherent in this material, limited rocking movement of the seal ring 22 about the centre of curvature C of the toroidal surface 20 as seen in a radial cross section of the rotor 16 can take place under the influence of certain types of forces applied to the rotor by shaft 12 particularly those causing angular deflection and end play of the latter. The remaining major components of the assembly would be made from steel. It is also contemplated that rotor 16 could be made of a "polycarbonate" plastic, i.e., a plastic filled with finely divided carbon particles. The seal ring 22 could be made from "Nylotron" (registered trademark) a plastic with a carbon filler which develops, in use, a very long wearing surface.

Figure 8:
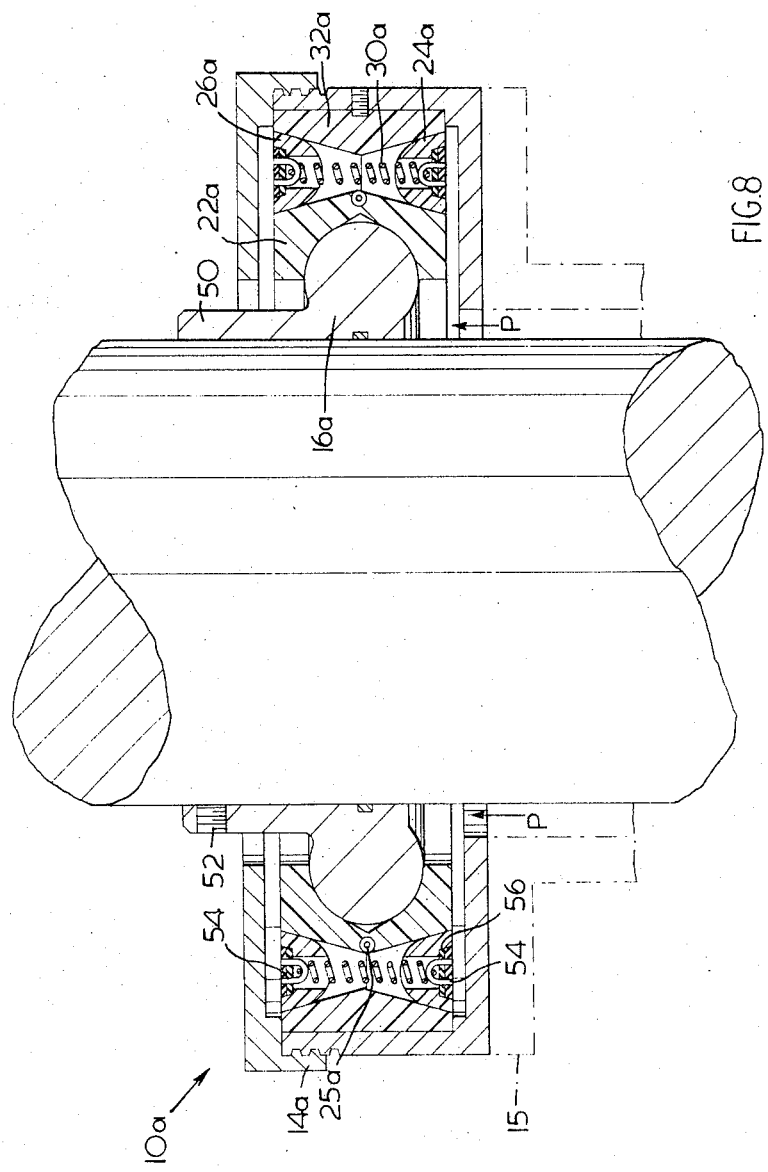
FIG. 8 is a view similar to that of FIG. 1 and illustrating a modified embodiment.

FIG. 8 relates to a modified arrangement. The seal includes housing 14a, the two portions of which are screwed together as illustrated. The rotor 16a is modified to include a barrel portion 50 which projects outwardly from the housing 14a. The barrel portion has a lock screw 52 accesible from outside the housing for securing the rotor to the shaft. The primary difference between the modified arrangement and the arrangement of FIGS. 1–7 is the provision of a plurality of coil tension springs 30a extending between the wedging rings 24a, 26a and serving to draw them together in the axial direction. The coil tension springs 30a are spaced apart equally circumferentially and are connected to wedging rings 24a, 26a by means of button-like anchors 54 engaged in suitable apertures formed in the wedging rings. Suitable gaskets 56 located between the wedging rings and the anchors 54 prevent fluid leakage therebetween. Since coil compression springs acting between the housing and the wedging rings are not present in the embodiment of FIG. 8, there is no need to provide anything, such as pins 31 described previously, for preventing rotation of wedging rings 24a, 26a relative to the housing. Furthermore, since the coil tension springs 30a are not exposed to the pressurized fluids, there is little chance of them becoming fouled with solids which may be contained in the pressurized liquids.

It is to be understood that the above disclosure has been made by way of example only and that numerous changes in details of construction may be resorted to without departing from the scope of the invention as hereinafter claimed.

I claim:

1. A mechanical seal for effecting a fluid seal between relatively rotatable machine elements, particularly between machine elements subject to extraneous forces causing relative deflection between said elements, said seal comprising:

a. a stationary housing adapted to permit passage of a shaft therethrough, b. a rotor adapted to surround and sealingly engage a shaft concentrically positioned within the confines of said housing and rotatable relative thereto about an axis, said rotor including an outwardly directed seal engaging surface thereon;

c. a floating seal ring surrounding said rotor and sealingly engaging said seal engaging surface of the rotor, said seal ring confining said rotor such that the only movement which can take place therebetween is rotation of said rotor relative to the seal ring about said axis, said seal ring being spaced radially from said housing;

d. and a plurality of wedging rings concentrically positioned in the space between said housing and the seal ring, said wedging rings have wedge-shaped radial cross-sections to provide wedging surfaces thereon, means defining wedging surfaces associated with said housing, said seal ring also being provided with wedging surfaces to contact the respective wedging surfaces of said wedging rings with all of said wedging surfaces being arranged such that said wedging rings, upon being biased in the axial direction, come into sealing contact with the wedging surfaces associated with both the housing and the seal ring;

e. and devices for biasing said wedging rings in the axial direction to effect said sealing engagement of the wedging rings between the seal ring and the means defining wedging surfaces associated with the housing;

f. all of said wedging surfaces as well as said biasing devices being so constructed and arranged as to permit floating movement of said seal ring relative to said housing in response to extraneous forces applied to said rotor while at the same time said sealing engagement between all of the wedging surfaces is maintained.

2. The seal according to claim 1 wherein the devices for axially biasing said wedging rings comprise resilient elements to facilitate movement of the wedging rings and said seal ring relative to one another and to said housing in response to said extraneous forces on said rotor.

3. The seal according to claim 2 wherein the wedging surfaces of said wedging rings complement said wedging surfaces defined on said seal ring and said means associated with said housing.

4. The seal according to claim 3 wherein a pair of said wedging rings are provided, said biasing devices being arranged to urge the wedging rings towards one another to bring their wedging surfaces into said sealing engagement with the seal ring and the means associated with said housing.

5. The seal according to claim 1 wherein said seal engaging surface of the rotor is of a toroidal configuration with said seal ring being shaped to closely embrace and complement the same.

6. The seal according to claim 1 wherein said seal engaging surface of the rotor is of a toroidal configuration with said seal ring being made of a flexible synthetic plastics material and being capable of limited relative rocking movement about the center of curvature of said toroidal surface as seen in a radial cross section of said rotor.

7. A mechanical seal for effecting a fluid seal between relatively rotatable machine elements, particularly between machine elements subject to extraneous forces causing relative deflection between said elements, said seal comprising a housing; a rotor positioned within the confines of saie housing and rotatable relative thereto about an axis, said rotor including a radially outwardly directed seal engaging surface thereon; a floating seal ring surrounding said rotor and sealingly engaging said seal engaging surface of the rotor, said seal ring confining said rotor such that the only substantial movement permitted therebetween is rotation of said rotor relative to the seal ring about said axis, said seal ring being spaced from said housing; means extending between said housing and the floating seal ring and constructed and arranged to provide a fluid seal between the housing and the seal ring, said means including a pair of rings and means adapted to bias said rings into fluid sealing relation with both the housing and the seal ring, both the seal ring and the housing being provided with means defining surfaces adapted to engage and complement the surfaces of said pair of rings thus to permit movement of said rings relative to one another in response to floating movement of the seal ring resulting from shock loads applied to said rotor.

8. The seal according to claim 7 wherein said seal engaging surface of the rotor is of a generally toroidal configuration with said seal ring being shaped to closely embrace and complement the same.

9. The seal according to claim 8 wherein said seal ring is made of a flexible material and is capable of limited relative rocking movement about the center of curvature of said toroidal surface as seen in a radial cross section of said rotor.

10. The seal according to claim 18 wherein said rotor is adapted to surround and sealingly engage a shaft, said housing being adapted to permit passage of the shaft therethrough.

* * * * *